(12) United States Patent
Berger

(10) Patent No.: US 8,698,876 B2
(45) Date of Patent: Apr. 15, 2014

(54) SINGLE CAMERA DEVICE AND METHOD FOR 3D VIDEO IMAGING USING A REFRACTING LENS ARRAY

(75) Inventor: Andrew M. Berger, Pearl River, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1182 days.

(21) Appl. No.: 12/320,309

(22) Filed: Jan. 23, 2009

(65) Prior Publication Data

US 2010/0188480 A1  Jul. 29, 2010

Related U.S. Application Data

(60) Provisional application No. 61/194,168, filed on Sep. 24, 2008.

(51) Int. Cl.
*H04N 15/00* (2006.01)
*H04N 13/00* (2006.01)

(52) U.S. Cl.
USPC ............... 348/42; 352/86; 359/462; 396/324

(58) Field of Classification Search
USPC .......................................................... 348/42
See application file for complete search history.

(56) References Cited

U.S. PATENT DOCUMENTS

| 7,046,447 B2 | 5/2006 | Raber | |
| 2005/0190282 A1* | 9/2005 | Shibagami | 348/335 |
| 2008/0151042 A1* | 6/2008 | Wang | 348/49 |
| 2009/0123144 A1* | 5/2009 | Maezono | 396/327 |
| 2009/0185279 A1* | 7/2009 | Goto | 359/629 |

FOREIGN PATENT DOCUMENTS

JP  6078337 A2  3/1994

OTHER PUBLICATIONS

Wang, Rong, et al., "Analysis and Optimization of the Stereo-System with a Four-Mirror Adapter," Journal of the European Optical Society, published Sep. 30, 2008, pp. 0833, 1-7.
Gao, Chunyu, et al., "A Refractive Camera for Acquiring Stereo and Super-Resolution Images," Proceedings of the 2006 IEEE Computer Society Conference, published Feb. 2006, pp. 2316-2323.

* cited by examiner

*Primary Examiner* — Jude Jean Gilles
*Assistant Examiner* — Jaren M Means
(74) *Attorney, Agent, or Firm* — Gregory J. Koerner; Redwood Patent Law

(57) ABSTRACT

An embodiment of the present invention may include an apparatus that captures 3D images having a lens barrel. The lens barrel may include a lens disposed at the first end of the lens barrel, an image capture element at the second end of the lens barrel, and a pair of refracting lenses positioned along the optical axis of the lens barrel. The first and second refracting lenses may be mounted to a first set and second set of positioning elements. The image capture element may capture images continuously at a predetermined frame rate, and the first and second set of positioning elements may continuously change the position of the first and second refracting lenses among a series of predetermined correlated positions based on the predetermined frame rate.

20 Claims, 6 Drawing Sheets

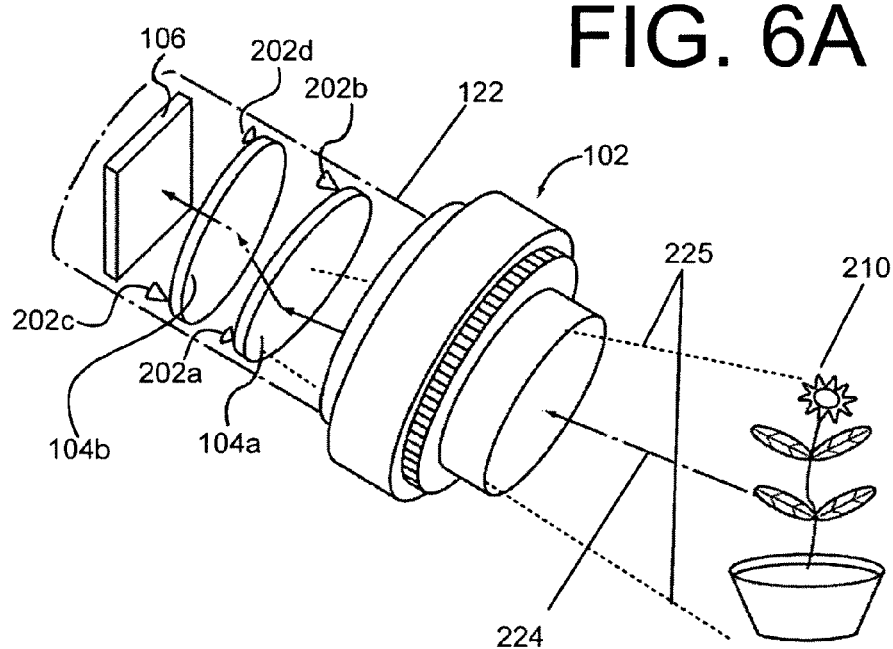
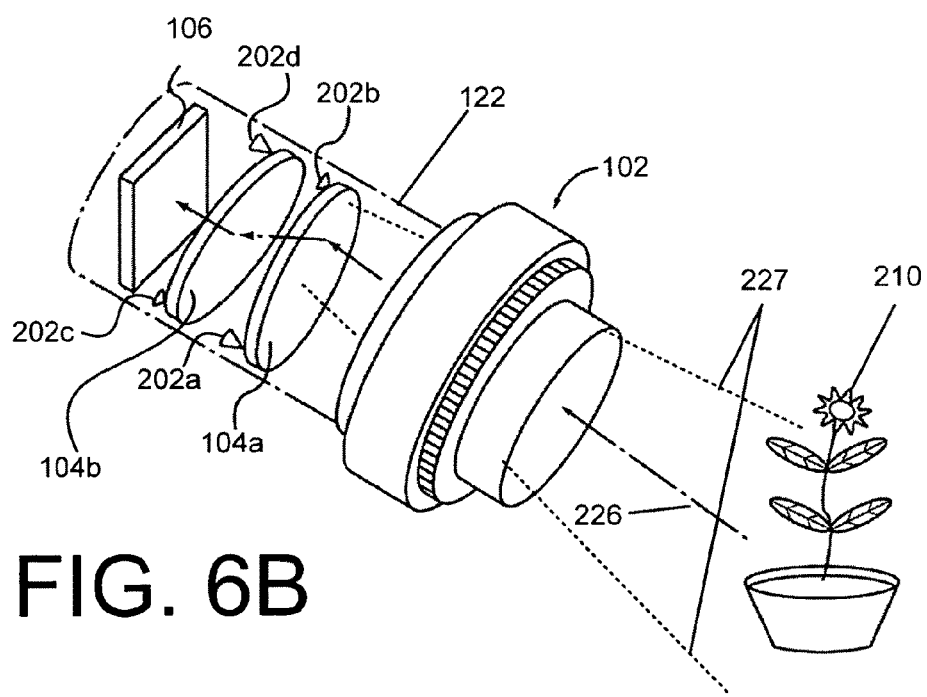

SINGLE CAMERA DEVICE AND METHOD FOR 3D VIDEO IMAGING USING A REFRACTING LENS ARRAY

CROSS REFERENCE TO RELATED APPLICATIONS

This application claims priority to U.S. provisional application Ser. No. 61/194,168 filed on Sep. 24, 2008. This application is related to U.S. non-provisional application Ser. No. 12/320,310 titled "Single Camera Device and Method for 3D Video Imaging Using Refracting Lens Array" filed on Jan. 23, 2009 the entire contents of which are hereby incorporated by reference.

BACKGROUND OF THE INVENTION

1. Field of the Invention

This invention relates generally to three-dimensional (3D) imaging and more particularly to a device and method for capturing 3D images and video using a camera having a single lens barrel.

2. Description of the Related Art

Non-contact three-dimensional cameras, or digitizers, generally fall into four categories: stereoscopic digitizers, silhouette digitizers, timing digitizers, and projected pattern digitizers.

Stereoscopic digitizers traditionally employ multiple two-dimensional (2D) cameras to produce multiple viewing angles to capture multiple images of the target object from different angles. A 2D camera is positioned at a known offset relative to other 2D cameras. Given the positions of each camera it is possible to provide a correlation algorithm the necessary variables to identify the three-dimensional location of objects in the images.

Stereoscopic digitizers attempt to mimic the visual and mental facilities of the eyes and brain to identify the location of object surfaces in 3D space. The eyes 20 and brain 25 work in conjunction to obtain a three-dimensional mental model of the target object 5 (FIG. 1). Each eye 20 captures its own view (10a and 10b) and the two separate images which are processed by the brain 25. Each eye 20 has a slightly different placement, resulting in a different point of view and field of view 10a (left) and 10b (right) of the target object 5. As a result, each eye obtains a slightly different left image 15a and right image 15b of the target object 5. When the two images 15a and 15b arrive simultaneously in the back of the brain, they are united into one model, by matching up the similarities and adding in the small differences. Using the two images 15a and 15b, the brain compares the right image 15a and left image 15b to identify the number and magnitude of the similarities between the images to correlate the relationship between the images. Using the correlation between the images, the brain creates a 3D model of the target object 5.

A minimum requirement for stereoscopic digitizers is the ability to obtain two images from two different points of view. FIG. 2 illustrates a conventional 3D stereoscopic camera setup. Conventionally, obtaining the minimum two images is done with two distinct 2D cameras 50a and 50b, each positioned at a pre-defined distance from one another. Each 2D camera 50 includes an image pickup device, such as a CCD 30 and lens 35 positioned along an optical axis 40. Each camera 50 is positioned to point to the same target object 45.

By using an algorithm to identify the similar surfaces in the image obtained from camera 50a and camera 50b, and given the pre-defined distance between the cameras 50, the algorithm computes the three-dimensional location of the surface of target object 45.

One problem with stereoscopic digitizers is that they are generally both bulky and expensive because they require the use of multiple 2D cameras. Furthermore, the performance of the 3D camera setup is dependent on the careful configuration and alignment of the 2D cameras. Any change in the distance between the cameras or the angle between the cameras can pose problems to the pattern recognition algorithm, forcing the re-calibration of the hardware and software for the changed positions.

SUMMARY OF THE INVENTION

The present invention provides a SINGLE CAMERA DEVICE AND METHOD FOR 3D VIDEO IMAGING USING A REFRACTING LENS ARRAY.

An example embodiment of the present invention may include an apparatus that captures 3D images having a lens barrel. The lens barrel may include a lens disposed at the first end of the lens barrel, an image capture element at the second end of the lens barrel, and a pair of refracting lenses positioned along the optical axis of the lens barrel. The first refracting lens may be mounted to a first set of positioning elements and the second refracting lens may be mounted to a second set of positioning elements. The first set of positioning elements and the second set of positioning elements may be configured to position the first refracting lens and second refracting lens such that a light beam, representing the center of the field of view, entering the lens barrel at a first angle, relative to the optical axis, is refracted by the first refracting lens to a second angle, relative to the optical axis, and then refracted to the center of the image capture element. The image capture element may capture images continuously at a predetermined frame rate, and the first and second set of positioning elements may continuously change the position of the first and second refracting lenses among a series of predetermined correlated positions.

Another example embodiment of the present invention may include a method for capturing 3D images. The method may include passing light through a lens at a first end of a lens barrel, capturing the light using an image capture element at a second end of the lens barrel, and positioning a first and second refracting lenses along an optical axis of the lens barrel. The method may also include positioning the first refracting lens and second refracting lens such that a light beam, representing the center of the field of view, entering the lens barrel at a first angle, relative to the optical axis, is refracted by the first refracting lens to a second angle, relative to the optical axis, and then refracted towards the center of the image capture element. The method may also further include capturing images continuously at a predefined frame rate, and continuously changing the position of the first and second refracting lenses between different positions at a rate corresponding to the predetermined frame rate.

The present invention can be embodied in various forms, including digital and non-digital image capturing devices and methods, robotic imaging devices, virtual simulations, and the like.

BRIEF DESCRIPTION OF THE DRAWINGS

These and other more detailed and specific features of the present invention are more fully disclosed in the following specification, reference being had to the accompanying drawings, in which:

FIGS. 6A and 6B illustrate an application of the example embodiment of the components of the lens barrel with respect to near objects in accordance with the present invention.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
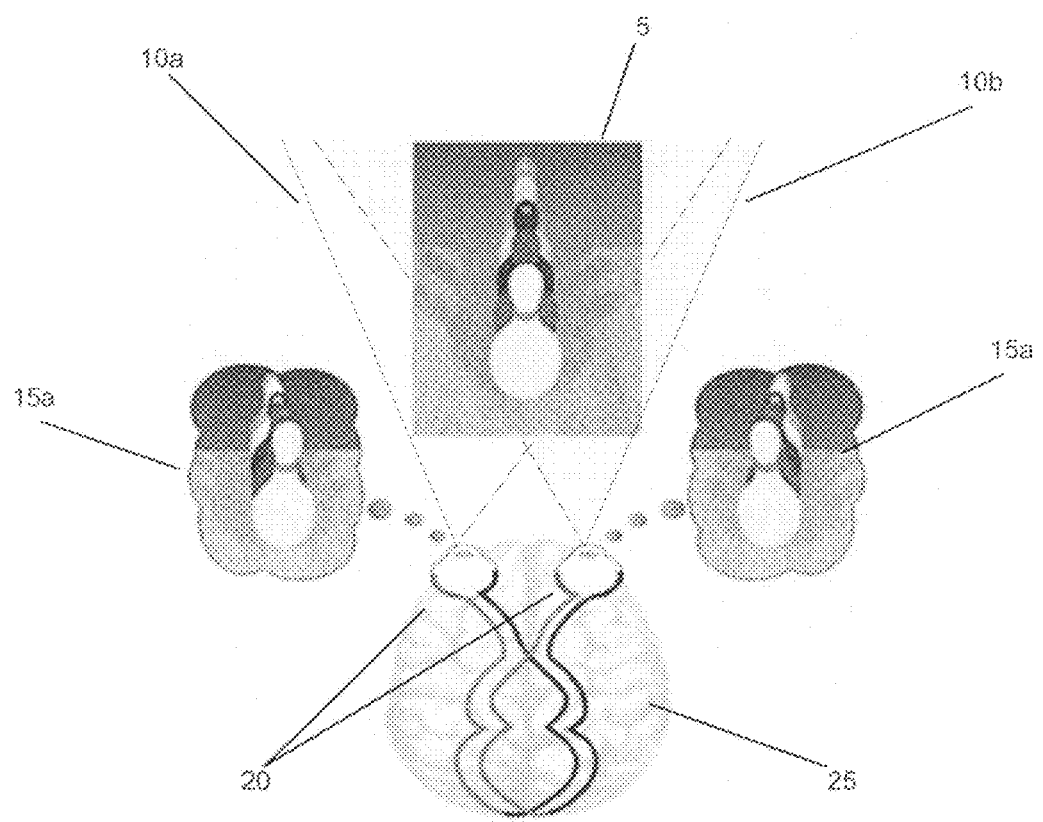
FIG. 1 is a diagram illustrating the basic principles of stereoscopy.
Figure 2:
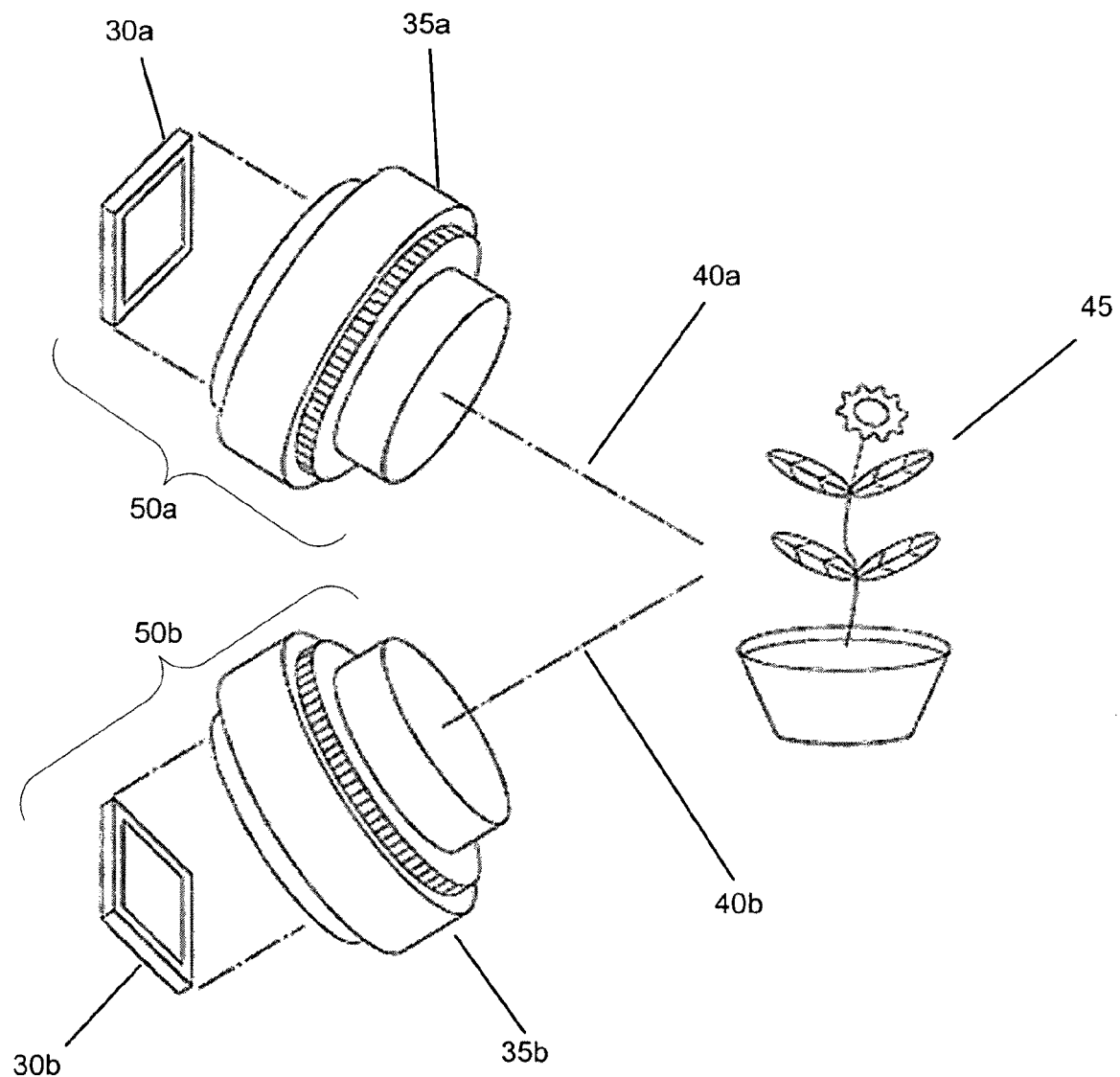
FIG. 2 is a diagram illustrating the conventional implementation of a stereoscopic camera.
Figure 3:
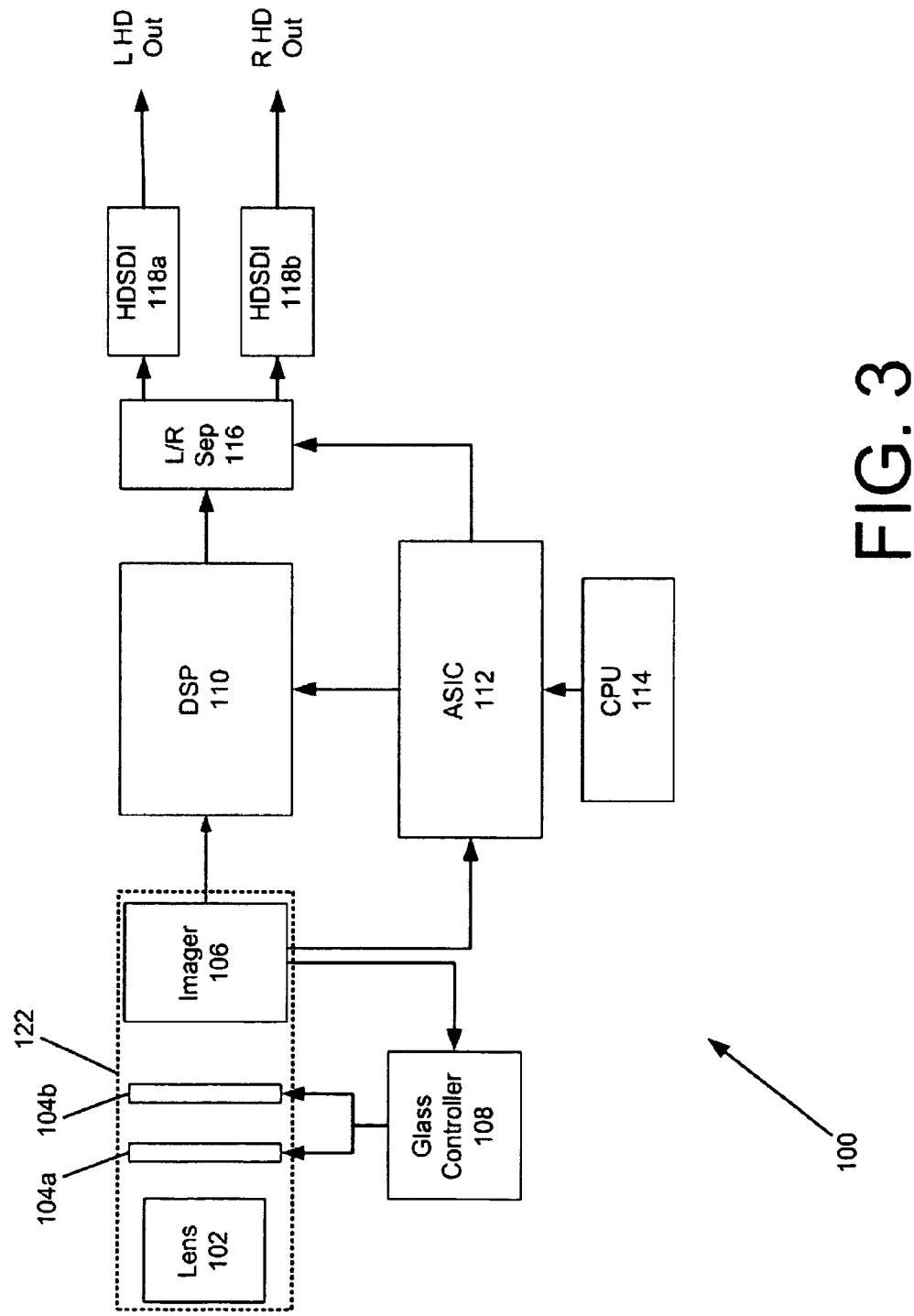
FIG. 3 is a diagram illustrating an example embodiment of the present invention.

FIG. 3 is a diagram illustrating an example embodiment of a 3D camera 100 in accordance with the present invention.

Camera 100 may receive an image, via a light source, through lens barrel 122, which includes a lens 102, a pair of refracting lenses 104a and 104b, and an imager 106. Imager 106 may be an image capture device. Alternatively, imager 106 may be an image pickup medium or a prism that deflects light at the end of the lens barrel 122 to an image pickup medium.

An image captured by imager 106 may pass to digital signal processor (DSP) 110, which may convert the image into a digitally storable format, such as a bitmap, jpeg, or other format appropriate for analysis. DSP 110 may be a conventional 2D type digital signal processor or a specialized processor for processing image data from imager 106. Camera 100 may also include a CPU 114 for controlling Application-Specific Integrated Circuit (ASIC) 112, and thereby control DSP 110 and L/R separator 116.

Left/right image separator (L/R separator) 116 may de-multiplex the image data output from DSP 110 into two independent outputs which are provided to HDSDI encoders 118a and 118b. The outputs of HDSDI encoders 118a and 118b pass through an external interface of camera 100 to a recording medium or transmission medium.

By properly refracting incoming light using refracting lenses 104a and 104b, camera 100 may capture two distinct images of a target object without using a plurality of lens barrels 122 or moving lens barrel 122. Camera 100 may quickly capture the two distinct images or record 3D video by operating the various components in a synchronized fashion. To capture 3D images or 3D video, camera 100 may operate imager 106, DSP 110, refracting lens controller 108, and L/R Separator 116, at a uniform frequency; for example, imager 106 may operate at a frame rate of 60 frames per second (60 fps). This frame rate is provided to refracting lens controller 108, DSP 110, and L/R Separator 116. Imager 106 may also provide information to refracting lens controller 108 to optimize stereoscopy effects by adjusting the separation and convergence of refracting lenses 104a and 104b based on the frame rate and output of imager 106.

During capture, refracting lens controller 108 may continually re-align the position of the refracting lenses 104a and 104b at a rate corresponding to the frame rate of the imager 106, e.g, 60 adjustments per second, ensuring that each frame captured by imager 106 represents an alternate image, e.g., a left image and a right image. The output of imager 106 is processed by DSP 110. The output of the DSP 110 is de-multiplexed by L/R separator 116, which may use a time de-multiplexing technique or other technique, in synchronization with the refracting lens controller 108 and imager 106 to produce two independent outputs which are encoded by HDSDI encoders 118a and 118b. However, it will be understood that the frame rate may be dictated by the available hardware, particular implementation, and situational lighting.

While the example embodiment performs stereoscopy using two refracting lenses 104a and 104b to create two points of view, it is equally possible to perform stereoscopy using any number of refracting lenses or any number of viewing angles while remaining within the spirit of the present invention. For example, refracting lenses 104a and 104b can alternate between 3, 4, or 5 aligned positions to obtain 3, 4, or 5 viewing angles using a single lens barrel and single imager. Refracting lens controller 108 only needs to be capable of aligning the refracting lenses 104a and 104b to produce a different viewing angle in synchronization with the frame rate of the imager 106.

Figure 4:
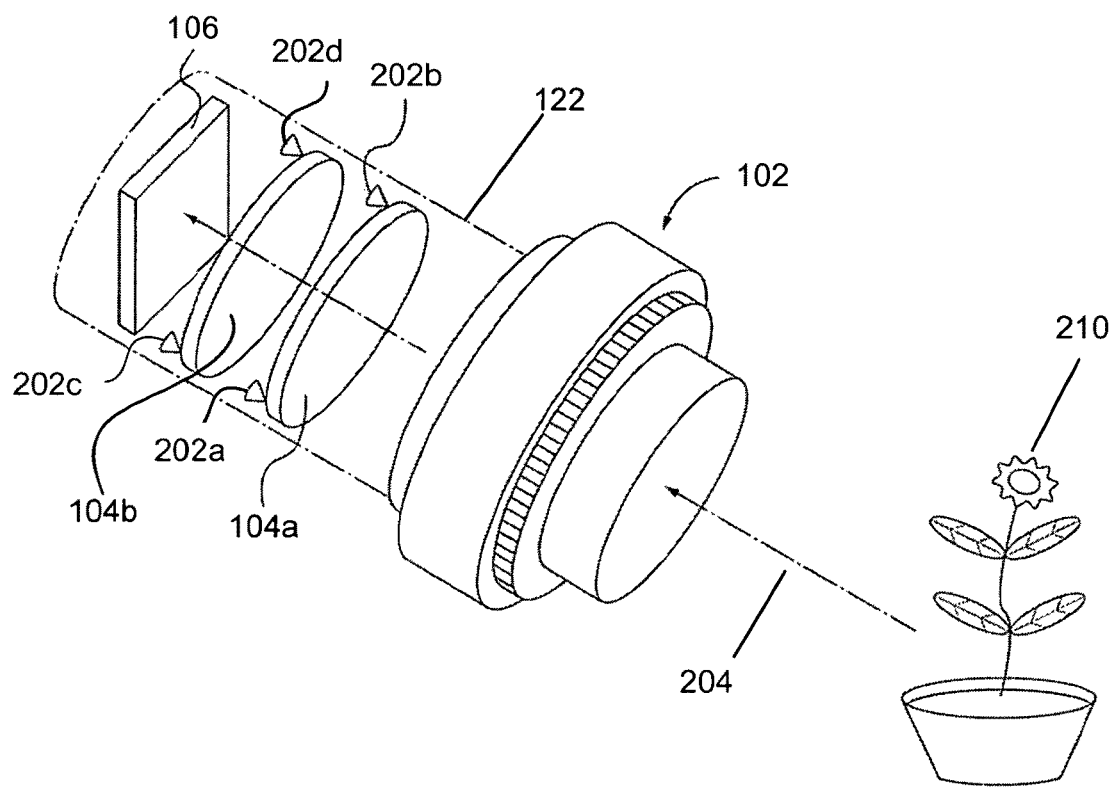
FIG. 4 is a diagram illustrating an example embodiment of the components of the lens barrel in accordance with the present invention.

FIG. 4 illustrates an example of a lens barrel 122, having optical axis 204, in accordance with the present invention.

Lens barrel 122 is directed towards target object 210. Lens barrel 122 includes lens 102, two refracting lenses 104a and 104b, imager 106, and piezoelectric devices 202a-202d, positioned along optical axis 204. Piezoelectric devices 202a and 202b adjust the position of refracting lens 104a, and piezoelectric devices 202c and 202d adjust the position of refracting lens 104b.

Piezoelectric devices 202a-202d are controlled by currents and voltages from refracting lens controller 108. Via piezoelectric devices 202a-202d, refracting lens controller 108 may change the positions of refracting lenses 104a and 104b in synchronization with the frame rate of imager 106. It is noted that piezoelectric devices 202 are used only for exemplary purposes and that, alternatively, piezoelectric devices 202 may be replaced with any combination of mechanical or electrical devices that may position the refracting lenses at the necessary positions at a rate corresponding to the frame rate of the imager 106.

Lens 102 and refracting lenses 104a and 104b, may take many forms, and may be formed of various substances or polymers including, but not limited to, glass, liquids, gels, or plastics. Imager 106 may be or may be used in conjunction with a CCD, CMOS, or any alternative light capturing mechanism.

Computing devices such as those discussed herein generally, such as for example, CPU 114, ASIC 112, and DSP 110 may each include instructions executable by one or more processors. Computer-executable instructions may be compiled or interpreted from computer programs created using a variety of programming languages and/or technologies known to those skilled in the art, including, without limitation, and either alone or in combination, Java™, C, C++, Assembly, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

Similarly the output of imager 106, DSP 110, L/R separator 116, HDSDI 118*a*, and HDSDI 118*b* also produce output that may be stored on a computer readable medium or transmitted via a transmission medium.

A computer-readable medium includes any medium that participates in providing data (e.g., instructions or images), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 5A:
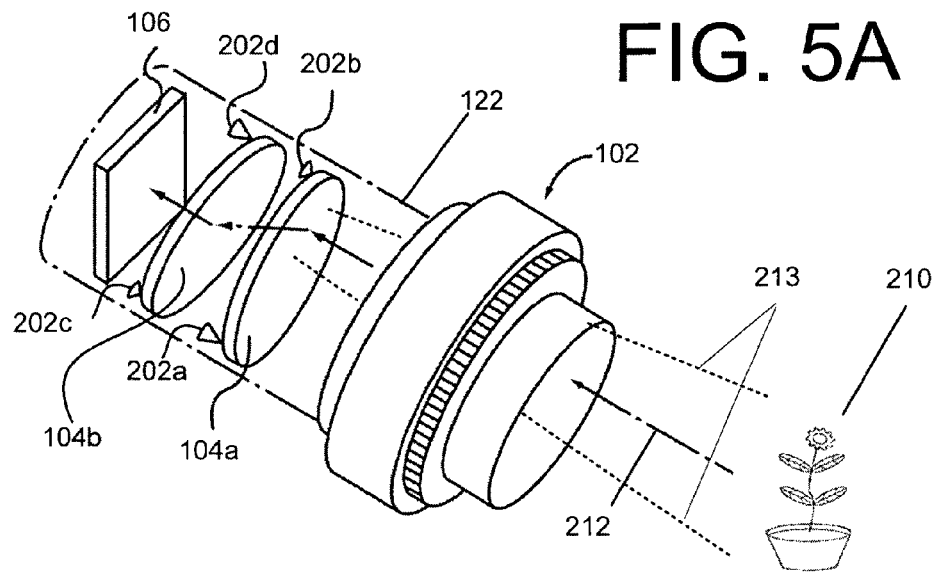
FIGS. 5A and 5B illustrate an application of the example embodiment of the components of the lens barrel with respect to distant objects in accordance with the present invention.
Figure 5B:
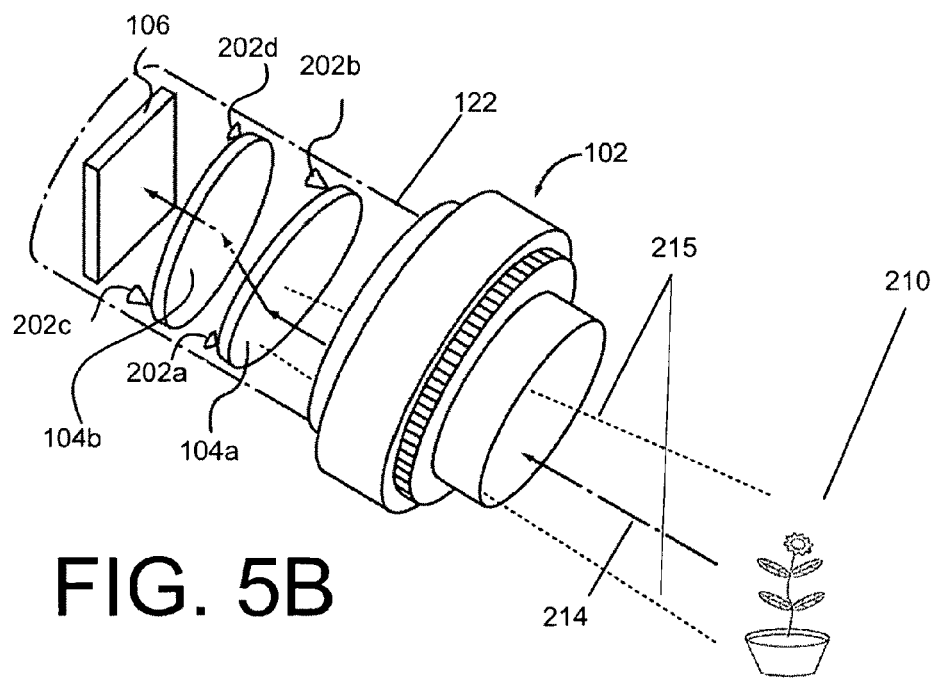

FIGS. 5A and 5B illustrate a lens barrel 122 during the stereoscopic imaging process. The lens barrel 122 is directed at a distant target object 210. By changing the position and alignment of refracting lenses 104*a* and 104*b*, camera 100 may capture two viewing angles of target object 210.

FIG. 5A shows light beam 212 coming from target object 210 into lens 102. Since target object 210 is distant, the light beam 212 from target object 210 is effectively parallel to the optical axis 204 of the lens barrel 122. In FIG. 5A, light beam 212 represents the center of the first (e.g., left) stereoscopic image captured by imager 106, and field of view 213 represents the range (e.g., width and/or height) of the captured image.

Light beam 212 is first refracted by refracting lens 104*a* towards the center of refracting lens 104*b*. Refracting lens 104*b* refracts light beam 212 towards the center of imager 106. Furthermore and alternatively, refracting lens 104*b* may be aligned so that light beam 212 will approach imager 106 at a perpendicular angle to imager 106 and parallel to optical axis 204, thereby providing the maximum possible light to the surface of imager 106.

Since light beam 212 is initially offset from the optical axis 204 but is refracted to the center of imager 106, the image captured by imager 106 will have a different point of view and field of view 213 than a non-refracted image.

FIG. 5B illustrates light beam 214 coming from target object 210 into lens 102. Since target object 210 is distant, the light beam 214 from target object 210 is effectively parallel to the optical axis 204 of the lens barrel 122. In FIG. 5B, light beam 214 represents the center of the second (e.g., right) stereoscopic image captured by imager 106, and field of view 215 represents the range (e.g., width or height) of the captured image.

Light beam 214 is first refracted by refracting lens 104*a* towards the center of refracting lens 104*b*. Refracting lens 104*b* refracts light beam 214 towards the center of imager 106. Furthermore and alternatively, refracting lens 104*b* may be aligned so that light beam 214 will approach imager 106 at an angle perpendicular to imager 106, thereby providing the maximum possible light to imager 106.

Light beam 214 is offset from the optical axis 204, but is refracted to the center of imager 106, causing the image captured by imager 106 to have a different point of view and field of view 215 from a non-refracted image.

The refracting lens configuration of FIG. 5A may produce a different image than the refracting lens configuration of FIG. 5B because each configuration has a different point of view and field of view, 213 and 215, respectively. Each field of view 213 and 215 gives the camera a slightly different image range, and the different points of view expose the imager 106 to different angles of the target object. While, with distant objects these distinctions may be subtle, the differences may be sufficient to identify the respective three-dimensional location of the surfaces of the target object 210.

During capture, lens barrel 122 may change configuration from FIG. 5A to FIG. 5B, and vice versa, at a frequency comparable to the frame rate of imager 106. For example if the imager operates at a frequency of 60 images per second (60 fps) then lens barrel 122 must cycle between the configuration from FIG. 5A to the configuration of FIG. 5B within each $\frac{1}{60}$ seconds. By continually changing the configuration of the refracting lenses, it is possible to obtain 3-D video or images of target object 210 at a frame rate of $\frac{1}{30}^{th}$ of a second, i.e., 1 image pair per $\frac{1}{30}$ seconds.

The depth perception of the device may be improved by increasing the ratio between the distance between the points of view and the distance of lens barrel 122 to the target object 210. This can be accomplished by either moving the target object closer to lens 102 or increasing the radius of lens barrel 122, lens 102, and refracting lenses 104*a* and 104*b*. This increases the divergence between fields of view 213 and 215.

FIGS. 6A and 6B illustrate two configurations of a lens barrel 122 having the target object 210 closer to lens barrel 122 than in FIGS. 5A and 5B. Alternatively, FIGS. 6A and 6B could also illustrate a lens barrel 122 having a greater radius, as compared to FIGS. 5A and 5B.

FIG. 6A shows light beam 224 coming from target object 210 into lens 102. Since target object 210 is nearby, the light beam 224 from target object 210 is slanted relative to the optical axis 204. In FIG. 6A, light beam 224 represents the center of the first stereoscopic image captured by imager 106, and field of view 225 represents the range (e.g., width or height) of the captured image.

Similarly, FIG. 6B shows light beam 226 coming from target object 210 into lens 102. Since target object 210 is nearby, the light beam 226 from target object 210 is slanted relative to the optical axis 204. In FIG. 6B, light beam 226 represents the center of the second stereoscopic image captured by imager 106, and field of view 227 represents the range (e.g., width or height) of the captured image.

In both FIGS. 6A and 6B, refracting lens 104*a* is aligned so that light beams 224 and 226 are first refracted by refracting lens 104*a* towards the center of refracting lens 104*b*. Refracting lens 104*b* is aligned so that light beams 224 and 226 are refracted towards the center of imager 106. Furthermore and alternatively, refracting lens 104*b* may be aligned so that light beams 224 and 226 may approach imager 106 at an angle perpendicular to imager 106, and parallel to the optical axis 204, to provide the maximum possible light to image 106.

Since the arrangement in FIG. 6A has field of view 225 and FIG. 6B has field of view 227, which are offset from one another but are refracted to the center of imager 106, the images captured by imager 106 for each configuration will appear to be from different points of view. This provides greater differences in the resulting images and thereby may improve depth perception compared to the configurations of FIGS. 5A and 5B.

While embodiments herein are discussed primarily with respect to a system embodiment, apparatus embodiment, and lens barrel configurations, the present invention is not limited thereto. For example, different various lens barrel 122 configurations and positioning mechanisms may be employed in positioning the refracting lenses 104a and 104b.

For example, it may be possible to replace piezoelectric devices 202 with alternative mechanical or electrical devices. For example, an alternative embodiment may position the refracting lenses at a static angle and rotate the lens barrel 122, or the refracting lenses 104a and 104b, at a rate corresponding to the frame rate of the imager 106. As this may have the same result as switching between different lens barrel configurations. Alternatively, an implementation may use the piezoelectric devices in conjunction with another mechanical or electrical approach to achieve the necessary synchronized positioning of the refracting lenses 104a and 104b in accordance with the frame rate of the imager 106.

Although embodiments of the invention are discussed primarily with respect to apparatuses for using a modified lens barrel and camera obtaining multiple images having different fields of view, and for obtaining three-dimensional images and video, other uses and features are possible. For example, an alternative embodiment may relate to a holographic projection device which can be formed by replacing imager 106 in lens barrel 122 with a projector LCD, thereby making it possible to alternatively project images onto a surface from two different points of view. Such dual or multiple projection-angle devices may create the appearance of a hologram on a target object. Various embodiments discussed herein are merely illustrative, and not restrictive, of the invention.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatuses, systems, assemblies, methods, components, materials, parts, and/or the like. In other instances, well-known structures, materials, or operations are not specifically shown or described in detail to avoid obscuring aspects of embodiments of the present invention.

Thus embodiments of the present invention produce and provide SINGLE CAMERA DEVICE AND METHOD FOR 3D VIDEO IMAGING USING A REFRACTING LENS ARRAY. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. An apparatus for capturing 3D images including a lens barrel having a first end where light enters the lens barrel and a second end, comprising;
   a lens disposed at the first end of the lens barrel;
   an image capture element at the second end of the lens barrel;
   a first refracting lens positioned along the optical axis of the lens barrel, the first refracting lens being mounted to a first set of positioning elements, the first set of positioning elements for changing the position and angle of the first refracting lens with respect to the optical axis;
   a second refracting lens positioned along the optical axis of the lens barrel between the first refracting lens and the image capture element, the second refracting lens being mounted to a second set of positioning elements, the second set of positioning elements for changing the position and angle of the second refracting lens independently of the position and angle of the first refracting lens.

2. The apparatus for capturing 3D images of claim 1, wherein the first set of positioning elements and the second set of positioning elements are configured to align the first refracting lens and second refracting lens such that a light beam, representing the center of the field of view, entering the lens barrel at a first angle, relative to the optical axis, is refracted by the first refracting lens to a second angle, relative to the optical axis, and then refracted to the center of the image capture element.

3. The apparatus for capturing 3D images of claim 1, wherein the first set of positioning elements and the second set of positioning elements are configured to shift the first refracting lens and second refracting lens such that light entering the lens barrel at a first angle, relative to the optical axis, is refracted by the first refracting lens to a second angle, relative to the optical axis, and then refracted to be parallel to the optical axis by the second refracting lens.

4. The apparatus for capturing 3D images of claim 1, wherein the image capture element captures images continually at a predetermined frame rate.

5. The apparatus for capturing 3D images of claim 4, wherein the first set of positioning elements are adapted to continually change the position of the first refracting lens to one position in a first series of predetermined positions; the second set of positioning elements are adapted to continually change the position of the second refracting lens to one position in a second series of predetermined positions; the positions in the first series of predetermined positions being correlated to the positions in the second series of predetermined positions.

6. The apparatus for capturing 3D images of claim 4, wherein the first set of positioning elements and the second set of positioning elements are adapted to change the positions of the first and the second refracting lens at a rate corresponding to the predetermined frame rate.

7. The apparatus for capturing 3D images of claim 4, wherein the first set of positioning elements are adapted to hold the first refracting lens at a first predetermined angle relative to the optical axis; the second set of positioning elements are adapted to hold the second refracting lens at a second predetermined angle relative to the optical axis; and the first set of positioning elements and the second set of positioning elements are mounted to at least one rotating elements that rotate the first refracting lens and second refracting lens about the optical axis.

8. The apparatus for capturing 3D images of claim 7, wherein the at least one rotating elements rotate the first refracting lens and second refracting lens at a rate of revolution corresponding to time period that is a multiple of the predetermined frame rate.

9. The apparatus for capturing 3D images of claim 1, wherein the first set of positioning elements and the second set of positioning elements are elements that change position in response to a current or voltage at a rate corresponding to the predetermined frame rate.

10. The apparatus for capturing 3D images of claim 1, wherein the first set of positioning elements and the second set of positioning elements are piezoelectric elements.

11. A method for capturing 3D images, comprising;
    passing light through a lens at a first end of a lens barrel;
    capturing the light using an image capture element at a second end of the lens barrel;

positioning a first refracting lens along an optical axis of the lens barrel so that a surface plane of the first refracting lens is not perpendicular to the optical axis, the first refracting lens being mounted to a first set of positioning elements;

positioning a second refracting lens along an optical axis of the lens barrel independently the first refracting lens, between the first refracting lens and the image capture element, so that a surface plane of the second refracting lens is not perpendicular to the optical axis, the second refracting lens being mounted to a second set of positioning elements.

12. The method for capturing 3D images of claim 11, wherein the steps of positioning the first refracting lens and second refracting lens include aligning the first refracting lens and second refracting lens such that a light beam, representing the center of the field of view, entering the lens barrel at a first angle, relative to the optical axis, is refracted by the first refracting lens to a second angle, relative to the optical axis, and then refracted towards the center of the image capture element.

13. The method for capturing 3D images of claim 11, wherein the steps of positioning the first refracting lens and second refracting lens include aligning the first refracting lens and second refracting lens such that light entering the lens barrel at a first angle, relative to the optical axis, is refracted by the first refracting lens to a second angle, relative to the optical axis, and then refracted to be parallel to the optical axis by the second refracting lens.

14. The method for capturing 3D images of claim 11, wherein the capturing step includes capturing images continually at a predefined frame rate.

15. The method for capturing 3D images of claim 14, wherein the first set of positioning elements continually change the position of the first refracting lens to different positions from a first series of predetermined positions; the second set of positioning elements continually change the position of the position of the second refracting lens to different positions from a first series of predetermined positions; the positions in the first series of predetermined positions be correlated to the positions in the second series of predetermined positions.

16. The method for capturing 3D images of claim 15, wherein the first set of positioning elements and the second set of positioning elements change the positions of the first and the second refracting lens at a rate corresponding the predetermined frame rate.

17. The method for capturing 3D images of claim 14, wherein the first set of positioning elements hold the first refracting lens at a first predetermined angle relative to the optical axis; the second set of positioning elements hold the second refracting lens at a second predetermined angle relative to the optical axis; and further comprising at least one rotating element that rotates the first refracting lens and second refracting lens about the optical axis.

18. The method for capturing 3D images of claim 17, wherein the at least one rotating elements rotate the first refracting lens and second refracting lens at a rate of revolution corresponding to a multiple of the predetermined frame rate.

19. The method for capturing 3D images of claim 11, wherein the first set of positioning elements and the second set of positioning elements are elements that receive a current or voltage at a rate corresponding to the predetermined frame rate.

20. The method for capturing 3D images of claim 11, wherein the first set of positioning elements and the second set of positioning elements are piezoelectric elements.

* * * * *